Figure 1:
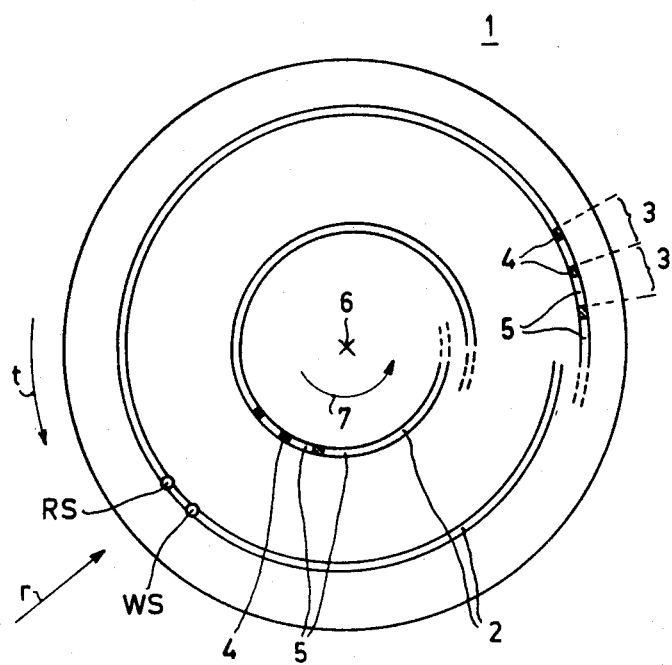

United States Patent [19]

Opheij et al.

[11] Patent Number: 4,546,463
[45] Date of Patent: Oct. 8, 1985

[54] APPARATUS FOR RECORDING AND READING INFORMATION TRACKS ON AN OPTICAL RECORD CARRIER WITH A BEAM OF RADIATION

[75] Inventors: Willem G. Opheij; Gerard E. van Rosmalen, both of Eindhoven, Netherlands

[73] Assignee: U.S. Philips Corporation, New York, N.Y.

[21] Appl. No.: 282,281

[22] Filed: Jul. 10, 1981

[30] Foreign Application Priority Data

Apr. 21, 1981 [NL] Netherlands ............... 8101932

[51] Int. Cl.$^4$ ............................................. G11B 7/00
[52] U.S. Cl. ..................................... 369/110; 369/122
[58] Field of Search ........................ 369/100, 109–111, 369/122; 358/342

[56] References Cited

U.S. PATENT DOCUMENTS

| | | | |
|---|---|---|---|
| 4,085,423 | 4/1978 | Tsunoda et al. | 369/122 |
| 4,100,577 | 7/1978 | Naruse et al. | 369/110 |
| 4,136,362 | 1/1979 | Naruse et al. | 369/110 |
| 4,150,399 | 4/1979 | Boonstra et al. | 369/110 |
| 4,167,024 | 9/1979 | Hamisch | 369/110 |
| 4,275,275 | 6/1981 | Bricot et al. | 369/109 |
| 4,298,974 | 11/1981 | Tsunoda et al. | 369/122 |
| 4,334,299 | 6/1982 | Komurasaki et al. | 369/110 |
| 4,334,300 | 6/1982 | Arquie et al. | 369/46 |
| 4,344,164 | 8/1982 | Bricot et al. | 369/110 |
| 4,345,321 | 8/1982 | Arquie et al. | 369/122 |
| 4,399,529 | 8/1983 | Leterme et al. | 369/112 |

FOREIGN PATENT DOCUMENTS

| | | | |
|---|---|---|---|
| 53-148412 | 12/1978 | Japan | 369/45 |
| 54-39102 | 3/1979 | Japan | 369/45 |
| 54-39103 | 3/1979 | Japan | 369/45 |
| 56-41530 | 4/1981 | Japan | 369/112 |

*Primary Examiner*—Robert L. Richardson
*Attorney, Agent, or Firm*—Robert T. Mayer; Algy Tamoshunas

[57] ABSTRACT

An apparatus is described for writing and reading information tracks in an information surface of a record carrier by optical radiation. The apparatus comprises two diode lasers, one of which produces the write beam and the other a read beam. By means of polarization sensitive device the write spot and the read spot formed on the information layer are projected at a very small and stable distance from each other and the beams reflected by the information layer are spatially separated. The separated beams are routed to separate detectors with residual cross-talk between the beams being eliminated by wavelength-selective filters.

17 Claims, 6 Drawing Figures

APPARATUS FOR RECORDING AND READING INFORMATION TRACKS ON AN OPTICAL RECORD CARRIER WITH A BEAM OF RADIATION

The invention relates to an apparatus for recording and reading information tracks in an information surface of a record carrier by means of optical radiation. Such an apparatus comprises a first radiation source producing a write beam, a second radiation source producing a read beam, an objective system for focusing the write beam and the read beam so as to form a write and a read spot on the information surface, which spots follow each other, viewed in the track direction, a polarisation-sensitive beam splitter and a polarisation rotator are arranged, in this order, between the second radiation source and the objective system. A radiation-sensitive detector is positioned in the path of the read beam which emerges from the beam splitter and which has been reflected by the information surface, and a wavelength-selective filter arranged before said detector.

Such apparatus, but especially intended for recording a frequency-modulated video signal, is known from German Patent Application No. 2,403,408, which has been laid open to public inspection. The information layer is constituted by, for example, a metal layer in which pits can be melted by the write beam, the information being for example represented by the frequency of the pits. The pits in a reflecting metal layer can be read optically in that they diffract the radiation of an incident read beam. Since simultaneously with the write beam a read beam is projected onto the information layer, the write spot and read spot formed by said beams being disposed close to each other and moving with the same velocity relative to the information tracks, information can be read immediately after it has been recorded and can be compared with the information which had to be recorded. Thus, it can be ascertained whether the information has been recorded correctly or whether re-recording is necessary.

In the apparatus in accordance with German Patent Application No. 2,403,408 the write beam is produced by an Argon-Ion laser and the read beam by a Helium-Neon laser. Especially the first-mentioned laser is comparatively bulky and expensive. If the apparatus is used for the manufacture of optical record carriers with a video program, which record carriers are intended for mass-marketing, an expensive and bulky recording apparatus need not be prohibitive. Indeed, a specific program has then to be recorded only once or, at the most, a few times on a so-called master. The master can then be used to make a large number of copies in a manner similar to that used for pressing the well-known audio records, which are played with a stylus. Then, only one write apparatus is required to furnish a very large public with a multitude of different video programs.

A recent development is to employ optical record carriers for the storage of digital data signals, for example signals supplied by and/or intended for an electronic computer. In that case each individual user of optical record carriers should have a separate write and read apparatus at his disposal. For that reason it is desirable to make the apparatus as simply and as cheaply as possible. This is incompatable with the use of the two gas lasers.

The write and read apparatus in accordance with German Patent Application No. 2,403,408 has only one detector for receiving the read beam reflected by the information surface. A polarisation-sensitive beam splitter and polarisation rotator, in the form of a $\lambda/4$ plate, $\lambda$ being the wavelength of the read beam, are then used for reflecting the reflected beam out of the path of the read beam which is directed towards the record carrier and to prevent the radiation of the first-mentioned beam from returning to the radiation source.

When optical record carriers are used as a medium in which the user can record information, the record carrier, may contain a so-called servo track (pre-grooved). This optically detectable track is employed for correctly guiding the write spot over the surface during information recording, that is along a spiral track or along a plurality of concentric tracks. The servo-track may be divided into a multitude of sectors each comprising an address portion and a blank track portion in which information can be recorded. Thus, a specific address is assigned to each information block, so that a random-access memory is obtained. The servo track may also contain a clock signal. This signal enables the velocity of the write spot in the track direction to be controlled during recording.

For an optimum use of a record carrier with a pre-grooved servo track a detector would be required which receives the write-beam radiation reflected by the information layer and converts it into an electrical signal. This signal may be employed for reading the addresses before the information is recorded, for controlling the position of the write spot relative to the servo track, or for controlling the velocity of the write spot in the direction of the servo track, and, for example, for controlling the write-beam focusing. The write beam, as long as it is not used for recording and has a lower power, could then also be used as a read beam.

In detecting the reflected write beam and read beam, the write-beam radiation should not be incident on the detector for the read beam and the read-beam radiation should not be incident on the detector for the write beam. Indeed, said beams return from different areas on the information layer and coincidence of the beams would mean that two phase-shifted signals would be superimposed.

It is an object of the present invention to provide write and read apparatus which meets the aforementioned requirements. To this end the apparatus according to the invention is characterized in that the first and the second radiation source are constituted by two substantially identical semiconductor-diode lasers, whose emitted radiation beams have different wavelengths. A a second detector is arranged in the path of the write beam which has been reflected by the information surface and which emerges from the beam splitter. The second detector is preceded by a second wavelength-selective filter, and that the polarisation rotator is also arranged in the path of the write beam.

Owing to the use of the diode lasers, the apparatus is cheaper and smaller, as well as more stable than the known apparatus. In view of the lower radiation energy of a diode laser, in comparison with that of a gas laser the apparatus has been designed so as to minimize the radiation loss, especially for the write beam which is directed towards the record carrier. For combining the write beam and the read beam which are directed towards the record carrier and for spatially separating said beams after they have been reflected by it, use is made of polarisation means. Said means may be constituted by the said polarisation-sensitive beam splitter and polarisation rotator, which are also employed for separating the read-beam and the write-beam radiation issuing from the record carrier from the radiation of said beams which is directed towards the record carrier, but they may also be constituted by other means. In order to minimize the residual cross-talk between the read beam and the write beam, which also persists if polarisation means are used, owing to the presence of optical elements and especially the record carrier which are non-ideal as regards double refraction, wavelength-selective filters are employed, which ensure that only write-beam radiation can be incident on one of the detectors and only read-beam radiation on the other detector.

It is to be noted that it is known per se, from German Patent Application No. 2,918,931 which has been laid open to public inspection, to employ two diode lasers, which may be constructed as one integrated element, in a combined write-and-read apparatus. However, said apparatus has no provisions for distinguishing the read beam and the write beam from each other. Moreover, the write spot and read spot are not shifted relative to each other in the track direction but transversely of the track direction, namely by one track period, so that the recorded information can only be read after one revolution of the record carrier.

A first embodiment of an apparatus in accordance with the invention, in which two diode lasers are accommodated in one housing, is characterized in that in the common radiation path of the write beam and the read beam, which have the same direction of polarisation, a highly selective half-wave plate and a polarisation-sensitive birefringent prism, which transmits both beams, are arranged, in this order, between the polarisation-sensitive beam splitter and the polarisation rotator.

a highly selective half-wave plate is a plate of a birefringent material whose double refraction, which is given by the product of the refractive-index difference and the thickness of the plate, for a beam of a first wavelength is an integral multiple of said wavelength and for a beam of a second wavelength is an integral multiple plus half the second wavelength. Such a plate rotates the direction of polarisation of the beam of the second wavelength through 90° and does not affect the direction of polarisation of the beam of the first wavelength. The polarisation-sensitive prism is preferably a Wollaston prism.

By means of the Wollaston prism the images of the two diode lasers can be combined even when the lasers are integrated on one support and, have a relatively large spacing, for example some hundreds of microns. The Wollaston prism also provides the spatial separation of the read beam and write beam reflected by the information layer. Use is then made of the rotation of the plane of polarisation of the read beam and write beam introduced by the polarisation rotator. The polarisation rotator is quarter-wave plate, which is not highly selective and which influences the direction of polarisation of the two beams in the same way. The highly selective half-wave plate ensures that the read beam and the write beam which are incident on the Wollaston prism for the first time have the desired orthogonal directions of polarisation. Preferably, the Wollaston prism is a symmetrical prism.

A second embodiment of an apparatus in accordance with the invention, in which the diode lasers are accommodated in separate housings, is characterized in that the read beam and the write beam have orthogonal directions of polarisation and that said beams are made to coincide substantially by the polarisation-sensitive beam splitter. In this embodiment the polarisation-sensitive beam splitter has a double function, namely combining the read beam and the write beam and separating the beams reflected by the information surface from the beams emitted by the radiation sources.

Preferably, the housings of the diode lasers are disposed substantially in parallel and a second beam splitter is arranged in the path of one of the beams, which beam splitter reflects radiation of said beam to the polarisation-sensitive beam splitter. The second beam splitter may be a wavelength-dependent beam-splitting mirror. The two housings can now be arranged close to each other, which yields a compact and mechanically and thermally stable construction.

The stability is further improved if the polarisation-sensitive beam splitter and the second beam splitter are rigidly secured to a common support in such a way that the total number of reflections of the beams by the two beam splitters is even. The two beam splitters may be formed by a first and a second partly reflecting surface within a composite prism. Tilting of the common support or of the composite prism then does not affect the relative position of the write spot and read spot on the information layer.

In order to enable the position of the read spot and the write spot relative to each other to be corrected in at least one direction, that is the direction in the information surface transverse to the track direction, and, as the case may be, in a second direction, that is the track direction, an apparatus with two substantially parallel diode-laser housings may further be characterized in that a first diode-laser housing is rigidly connected to a frame, whilst one side of a second diode-laser housing is connected to the same frame so as to be resilient in at least one direction, and that there are provided mechanical means for adjusting the second diode-laser housing relative to the first one.

In order to enable the focusing of the read beam and write beam relative to each other to be corrected, an adjustable lens may be arranged in the path of one of said beams which is directed towards the record carrier.

Figure 2:
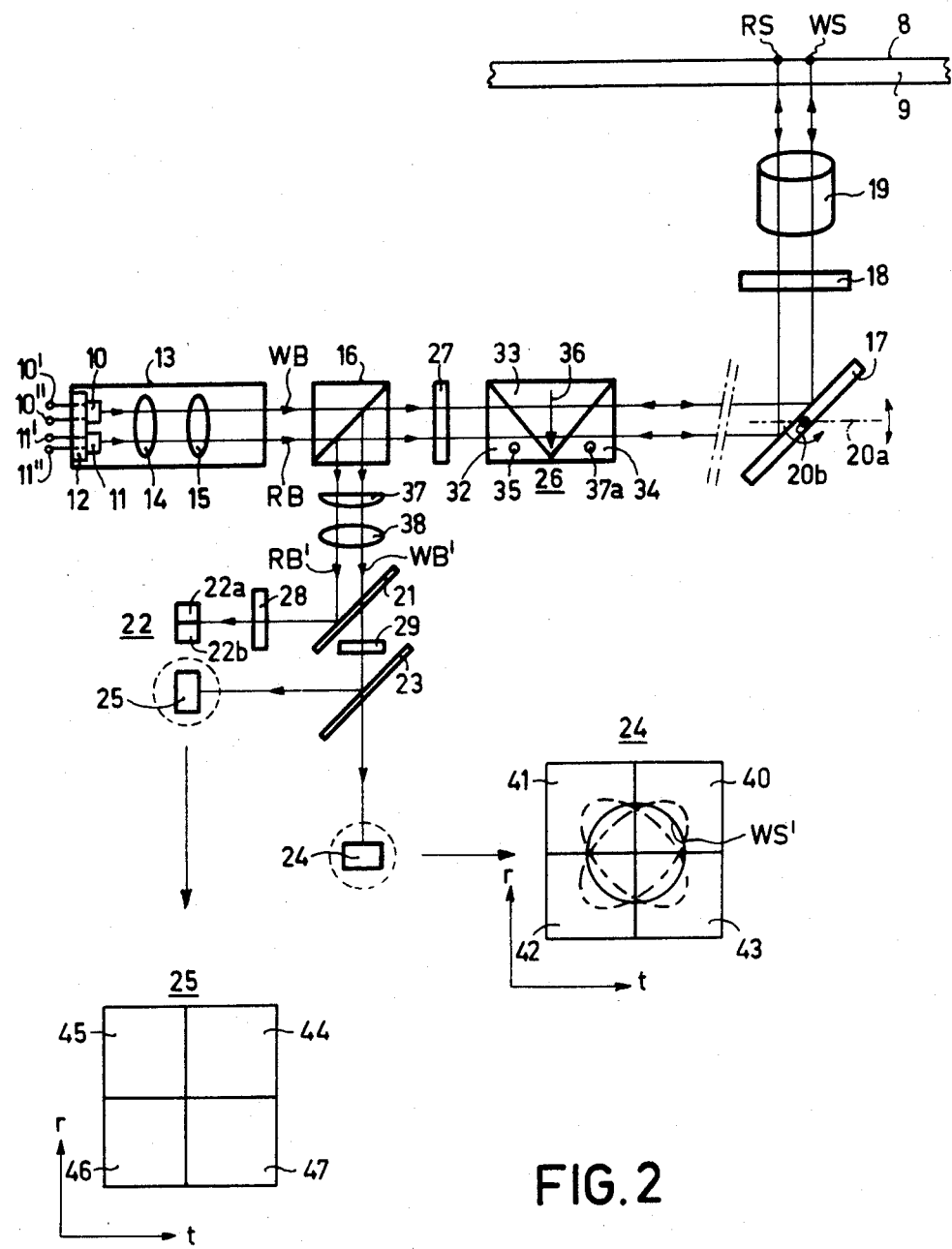
Figure 3:
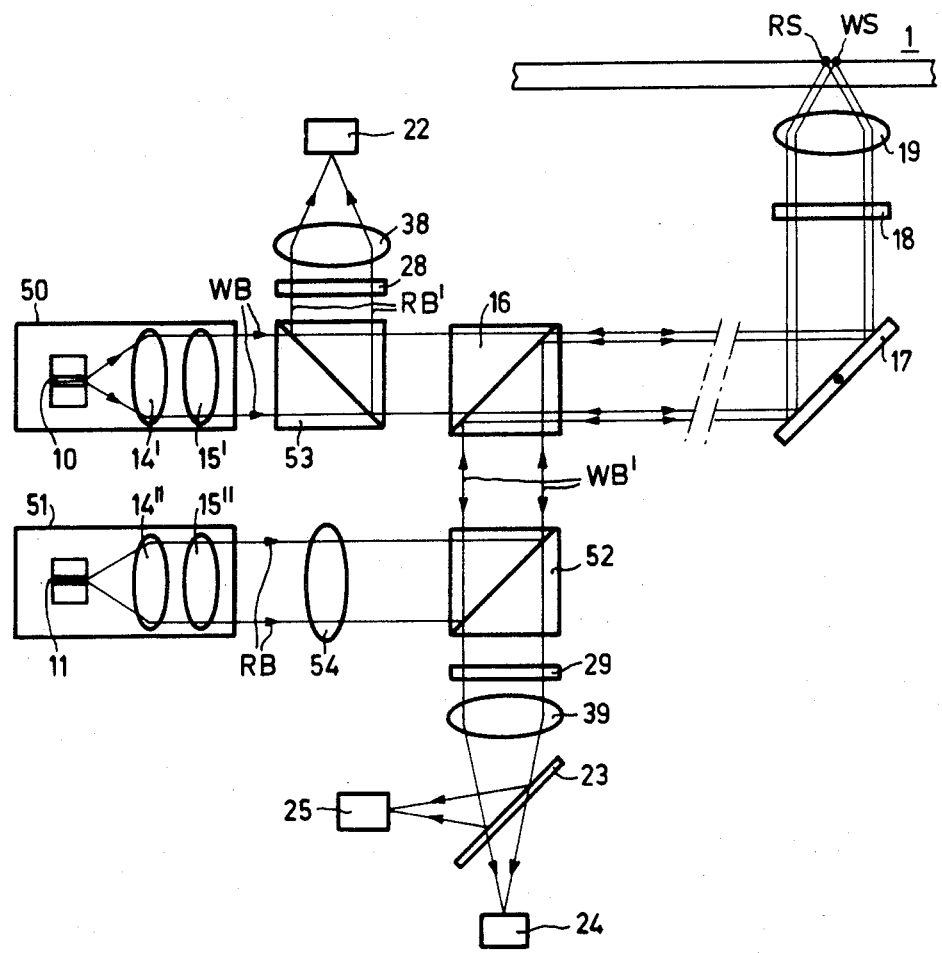
Figure 4:
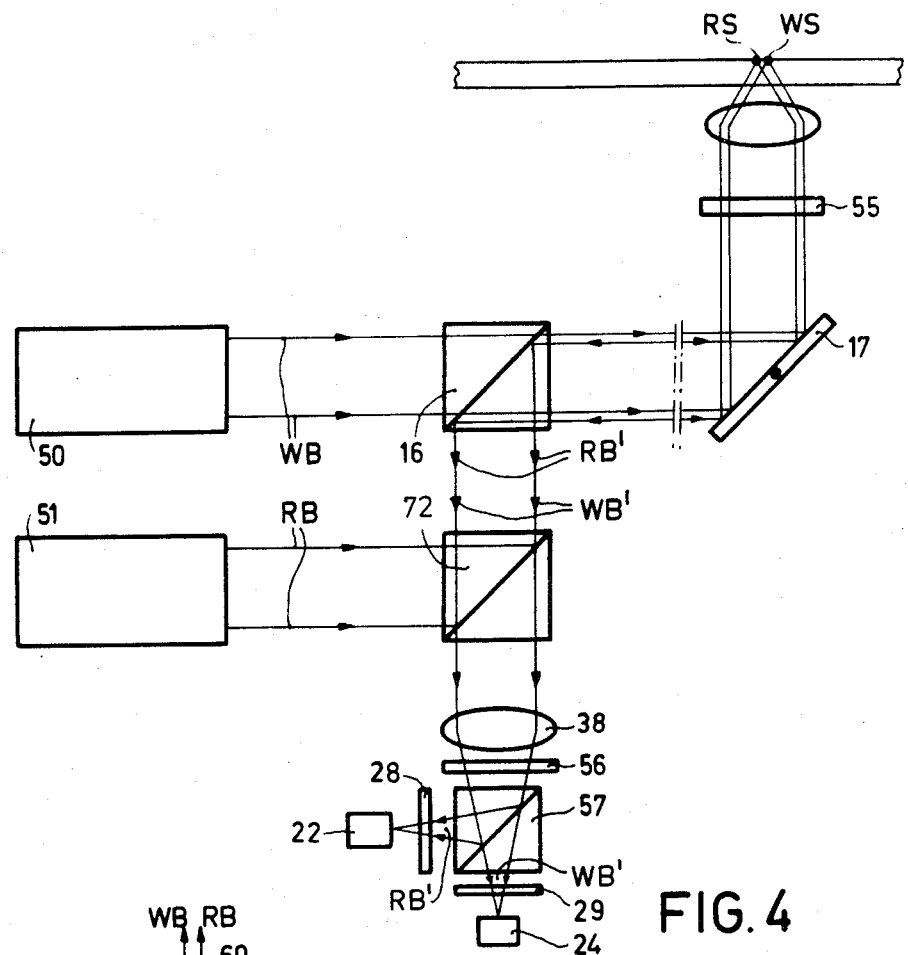
Figure 5:
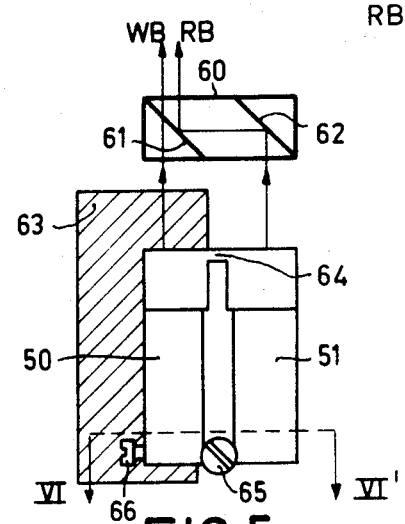
Figure 6:
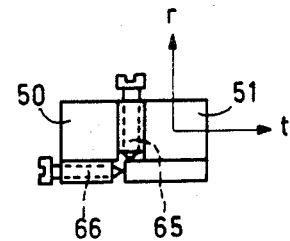

The invention will now be described in more detail with reference to the drawing, in which:

FIG. 1 shows a known record carrier with a pregrooved servo track, which can be inscribed by a user, FIG. 2 shows an embodiments of the apparatus in accordance with the invention wherein two lasers are mounted in a single housing, FIG. 3 shows an embodiment of the apparatus in accordance with the invention wherein the two lasers are mounted in separate housing, FIG. 4 shows another embodiment of the apparatus in accordance with the invention, FIG. 5 shows a holder for two diode laser housings, and FIG. 6 shows a detail of the holder shown in FIG. 5.

FIG. 1 is a plan view of a disc-shaped record carrier body 1, in which a user can record user-specific information. Said carrier body is provided, for example, with a spiral servo track 2, which is divided into a multitude of sectors 3, for example 128 per revolution. Each sector comprises a continuous and optically detectable track portion 5, which during recording is used for recording the information in accordance with a well-defined path on the record carrier body, and a sector address 4 which inter alia contains the address of an associated track portion 5 in digital form in address areas, not shown. Said areas may comprise pits pressed into the record-carrier surface or hills projecting from said surface. The record-carrier body is provided with a layer of material which, if exposed to suitable radiation, undergoes an optically detectable change. Information recording may for example be effected by melting pits into the metal layer by means of the write beam. For further details on the record carrier reference is made to Netherlands Patent Application No. 7802859, which has been laid open to public inspection and corresponds to U.S. Pat. No. 4,363,116.

Two radiation spots RS and WS are projected on the record carrier. In the track direction, the direction t in FIG. 1, the spots are slightly shifted relative to each other over a small distance and move with a same velocity relative to the track during recording. The movement of the radiation spots relative to a track is obtained by rotating the record carrier about the axis 6 in the direction of the arrow 7. During writing the leading radiation spot WS is used for reading the addresses and, once the correct address has been found, to record information in the associated track portion. The radiation spot RS is used for reading the information immediately after it has been recorded, so that writing errors can be detected during recording. The read spot is located at a short distance from the write spot, so that at the end of the sector area 5 it can be ascertained whether the information has been corectly recorded in said area and to decide whether the information is to be rerecorded in another area. For reading information already recorded, either the spot RS or the spot WS may be used. Both in the write mode, and in the read mode the spot WS may be used for generating a focusing error signal and a radial error signal, that is a signal which provides an indication of a deviation, in the direction r, between the centres of the spots WS and RS and the centre of the servo track 2.

FIG. 2 schematically shows a first embodiment of an apparatus by means of which the record carrier shown in FIG. 1 can be inscribed and read. Said apparatus comprises two radiation sources 10 and 11, in the form of diode lasers, one of which produces a write beam WB and the other a read beam RB. For simplicity only the chief rays of said beams are shown. A mirror 17 reflects the read beam and the write beam to an objective system 19 which focuses said beams to form the radiation spots WS and RS on the information surface of the record carrier. FIG. 2 shows a small part of the record carrier 1 in tangential cross-section, that is a sectional view in accordance with the arrow t in FIG. 1. Preferably, as is shown in FIG. 2, the information layer is exposed through the substrate 9, so that said substrate acts as a protective layer. The mirror 17 may be pivotal about an axis 20a in the plane of the drawing to permit correction of the positions of the spots WS and RS transverse to the track direction. Moreover, the mirror may be arranged to be pivotal about the axis 20b, perpendicularly to the plane of drawing, to permit correction of the positions of the spots WS and RS in the track direction.

The beams WB and RB are reflected by the information surface, pass through the objective system 19, and are reflected in the direction of the radiation sources 10 and 11 by the mirror 17. In order to separate the reflected beams WB' and RB' in an optimum manner and with a minimal loss of radiation of the incident beams WB and RB, a polarisation-sensitive beam-splitting prism 16 and a $\lambda/4$ plate 18 are arranged in the radiation path, $\lambda$ being the average wavelength of the beams. The beams emitted by the two diode lasers have the same direction of polarization, which is such that said beams are transmitted almost completely by the prism 16. The beams then traverse the $\lambda/4$ plate 18 two times, so that their direction of polarisation is rotated through 90°. As a result of this, the reflected beams WB' and RB' are almost fully reflected by the prism 16.

The diode lasers are driven by electric currents applied to their input terminals 10', 10" and 11', 11" respectively. Since a smaller amount of radiation energy is required for reading than for writing, the current through the diode laser 11 may be smaller than that through the diode laser 10. By modulating the electric current for the write laser 10 with the information to be written, the intensity of the write beam is modulated in accordance with the information.

The diode lasers 10 and 11 are arranged on a common support 12 within one housing 13. Said lasers emit divergent beams, which are moreover astigmatic. The housing may accommodate a cylindrical lens 15, with which the astigmatism is eliminated, and a collimator objective 14, which collimates the beams. By the use of parallel beams WB and RB only the objective system 19 and the pivoting mirror 17 need to be arranged on a movable carriage and the other elements of the apparatus, specifically the diode laser, may be stationary. Then, only a low mass need to be displaced in the case of corrections, which may be effected with a high speed.

The radiation spots RS and WS should be arranged very close to each other, for example at a distance of 10 microns. When using an objective system whose reduction is two times, the radiation-emitting surfaces of the diode lasers should be spaced at 20 microns from each other. With the present technology said surfaces can be arranged at a minimum distance of approximately 300 microns from each other, owing to the dimensions of the diode lasers, the space required for the connecting wires and the desired cooling.

In order to obtain the desired 10 microns distance between the read spot and the write spot, the images of the diode lasers are moved towards each other with the aid of a polarisation-sensitive prism 26, which transmits both beams. Such a prism has the property that it deflects the two beams, which have perpendicular directions of polarisation, in opposite directions. By a suitable choice of the directions of polarisation of the beams and the optic axes of the prism, and prism can be made to differt the beams emitted by the diode lasers 10 and 11 towards each other. Moreover, the beams which are reflected by the information layers, whose direction of polarisation is rotated through 90° relative to the beams directed towards the record carrier, are deflected apart by said prism, so that the desired spatial separation at the location of the detectors is obtained. The prism is suitably a Wollaston prism. In principle, any other type of birefringent prism, such as a Rochon prism, may be used. However, the last-mentioned prism deflects the beams relative to each other at an angle which is only half the angle introduced by a Wollaston prism. The prism 26 can only perform its function if the beams WB and RB have perpendicular directions of polarisation. Then, a $\lambda/2$ plate should be arranged in the path of one of the beams emitted by the sources 10 and 11, which have the same direction of polarisation.

In principle, the desired separation of the images of the spots WS and RS on the detectors 22 and 24 (25) can be achieved by means of the Wollaston prism and the λ/2 plate only, but then very stringent requirements should be imposed on the degree of polarisation of the radiation sources, on the quality of the optical elements, and on the substrate of the record carrier. Said substrate should exhibit no double refraction. In order to achieve a sufficiently low cross-talk without having to meet such very stringent requirements, two diode lasers are used, in accordance with the invention, which emit different wavelengths. Arranged in front of the detectors 22 and 24 (25) are wavelength-selective filters 28, 29, which only transmit the read beam or the write beam to the respective detector 22 and the detector 24 (25). Then, a highly selective λ/2 plate is arranged before the Wollaston prism, that is, a plate which rotates the direction of polarisation of only one of the beams through 90° and which does not affect the direction of polarisation of the other beam.

The filters 28 and 29 may be reflection filters which transmit the desired beam and reflect the undesired beam. Said filters have a resolution of one in a hundred, that is, only one percent of the undesired radiation is transmitted. By arranging a plurality of reflection filters in line with each other the resolution may be further increased.

The minimum difference between the wavelengths of the read beam and the write beam is determined by the resolution and the slope of the filters. For example, the minimum difference may be 60 nm. Said wavelength difference is sufficiently small to obtain the desired rotation of the polarisation of the two beams through 90° by means of one λ/4 plate 18.

Preferably, the Wollaston prism is a symmetrical prism, as is shown in FIG. 2. Said prism comprises three constituent prisms 32, 33 and 34 of a birefringent material. The optic axes 35 and 37a of the constituent prisms 32, and 34 are parallel to each other, whilst the optic axis 36 of the constituent prism 33 is perpendicular to the optic axes 35 and 37a. Owing to the symmetrical construction the composite prism 26 is not astigmatic, unlike a conventional Wollaston prism. A non-astigmatic prism is to be preferred, because owing to the different wavelengths of the beams which pass through the same optical elements, chromatic aberrations may occur, so that the beams may become slightly divergent or convergent. For further details about the prism 26 reference is made to U.S. Pat. No. 3,978,278, which describes such a prism.

The reduction of the distance between the read spot and the write spot on the information surface 8 introduced by the Wollaston prism 26 is very stable and independent of tilting or displacements of said prism. Owing to the small distance between the diode lasers 10 and 11 the position of said lasers relative to each other in their common housing 13 is also very stable.

In one embodiment of the apparatus the diode lasers were adjusted in such a way relative to each other in three orthogonal directions that the read spot and the write spot, viewed in the direction of the chief rays, were shifted by, at the most, 1 micron relative to each other, whilst in the radial direction the distance between the spots was maximum 0.1 micron. In the tangential direction the distance between the spots was of the order of 10 to 20 microns.

Since the highly selective λ/2 plate 27 is also traversed twice, the beam whose direction of polarization is influenced by said plate will also be reflected by the polarisation-sensitive constituent prism 16. In the radiation path of the beams WB' and RB' a beam splitter 21 is arranged, which reflects a part of the radiation to the detector 22 for the read beam RB' and transmits the remainder of the radiation to the detector 24 (25) for the write beam WB'. The respective detector 22 or 24 (25) is arranged so that it mainly receives read-beam or write-beam radiation and hardly any radiation of the write beam and read beam respectively. The respective filters 28 and 29 ensure that the residual radiation of the write beam or the read beam cannot reach the detector 22 or 24 (25). Suitably, the beam splitter 21 is a wavelength-selective mirror which provides a first wavelength separation.

The detector 22 may comprise a single radiation-sensitive element, for example a photo-diode, whose center is situated on the chief ray of the read beam RB'. By means of this detector the variation of the overall intensity of the radiation which is reflected by the information surface 8 and passes through the pupil of the objective system 19 is detected. The read method adopted here is known as the integral read method.

It is alternatively possible to employ the so-called differential read method. In that case the difference in intensity of two radiation components which pass through two tangentially different halves of the pupil of the objective system is detected. In that case the detector should comprise two radiation-sensitive elements, 22a and 22b in FIG. 2, which are arranged after each other in the track direction. By subtracting the output signals of said elements from each other the read signal is obtained. Suitably, the integral read method is used for the reading the addresses and the recorded information, and the differential read method for reading the clock signal in the servo track.

The write-beam radiation which is reflected by the information surface 8, in addition to being used for reading the addresses and the clock signal in the servo track, may be used for generating a focusing-error signal and a tracking signal. For obtaining the focusing-error signal, the detector 24 may be divided into four subdetectors 40, 41, 42 and 43, as is shown in the right-hand inset in FIG. 2, and a cylindrical lens 37 may be arranged in the path of the reflected write beam WB'. The optical system comprising the objective system 19 and the cylindrical lens 37 is an astigmatic system, which does not focus the write beam in a single spot but to two mutually perpendicular focal lines which are shifted along the optical axis. The composite detector 24 is arranged in the middle between said focal lines, not shown. This ensures that in the case of correct focusing of the write beam the radiation spot WS' is circular, whilst in the case of a focusing error said radiation spot becomes elongate, as is shown in the inset in FIG. 2. The longitudinal direction of said spot depends on the sign of the focusing error. If the signals from the subdetectors 40, 41, 42 and 43 are represented by $S_{40}$, $S_{41}$, $S_{42}$ and $S_{43}$ respectively, the focusing-error signal $S_f$ is expressed as:

$$S_f = (S_{40} + S_{42}) - (S_{41} + S_{43})$$

This focusing-error detection method is only mentioned by way of example. An equally satisfactory focusing-error detection is possible by arranging a roof-edge prism, which splits the beams into two subbeams, in the path of the reflected write beam substantially in the plane in which said beam is focused, and by arranging four detectors in line behind said prism. The difference between the sum signal of the outer detectors and the sum signal of the inner detectors is the focusing-error signal. For details on said focusing-error detection method reference is made to FIGS. 7 and 9 of Netherlands Patent Application No. 78 02859, corresponding to U.S. Pat. No. 4,363,116.

If focusing-error detection is effected by means of an astigmatic element and four detectors, the read beam is preferably employed as focusing-error detection beam and the detector 22 is replaced by a composite detector such as the detector 24.

For deriving the other signals from the write beams WB', there may be provided a second detector 25. Then a beam splitter 23, for example a semitransparent mirror, is arranged in the path of the beam WB'. In order to obtain a tracking signal, the detector 25 may be divided into two subdetectors, which are radially shifted relative to each other with respect to a track 2 on the record carrier. The difference between the output signals of said subdetectors is then proportional to a deviation between the centre of the radiation spot WS and the centre of the track. In order to enable the clock signal to be read by means of the differential read method, the detector 25 suitably comprises four subdetectors 44, 45, 46 and 47, as is shown in the left-hand inset in FIG. 2. The orientation of the subdetectors relative to tracks of the record carrier is represented by the arrows r and t, which represent the radial direction and the tangential direction. If the signals from the subdetectors 44, 45, 46 and 47 are $S_{44}$, $S_{45}$, $S_{46}$ and $S_{47}$ respectively, the tracking signal $S_r$ is given by:

$$S_r = (S_{44} + S_{45}) - (S_{46} + S_{47}),$$

the differential read signal or the clock signal $S_c$ by:

$$S_c = (S_{44} + S_{47}) - (S_{45} + S_{46}),$$

and the integral read signal or the data signal $S_D$ by:

$$S_D = S_{44} + S_{45} S_{46} + S_{47}.$$

The data signal can also be obtained from the detector 24, namely by adding the output signals of the subdetectors to each other.

In principle, it is alternatively possible to dispense with the detector 25 and the beam-splitting mirror 23 and to employ the detector 24 for deriving the four signals $S_f$, $S_r$, $S_c$ and $S_D$, provided that the separating lines of the subdetectors 40, 41, 42 and 43 are parallel to the radial direction r and the tangential direction t.

FIG. 3 shows an embodiment of a write-read apparatus in which the two diode lasers are accommodated in separate housings 50 and 51. Each of said housings, in addition to a diode laser 10 and 11 respectively, contains a collimator objective, 14' or 14", and a cylindrical lens, 15' or 15". The two diode-lasers emit parallel radiation beams, WB and RB. Said beams have orthogonal directions of polarisation which have been selected so that the write beam is transmitted to the record carrier by the polarisation sensitive beam splitter. As a result of the two passages of the λ/4 plate 18 the direction of polarisation of said beam is rotated through 90°, so that the reflective beam WB' is reflected to the detector 24 (25) by the beam splitter 16.

The read beam RB emerging from the diode-laser housing 51 is firstly incident on a beam splitter 52, suitably a wavelength-selective mirror which almost completely reflects the read beam RB and almost completely transmits the reflected write beam WB'. Subsequently, the read beam is reflected to the record carrier by the polarisation-sensitive beam splitter 16. The returning read beam RB', whose direction of polarisation has been rotated through 90°, is transmitted by the beam splitter 16 and is reflected to the detector 22 by a further beam splitter 53, which is suitably also wavelength-selective. In the paths of the beams RB' and WB' lenses 38 and 39 are arranged, which focus the collimated beams at the detectors 22 and 24 (25). The wavelength-selective filters 28 and 29 are arranged in the collimated beams RB' and WB'.

It is desirable to test the recorded information areas with the radiation beam whose wavelength differs to a minimal extent from that of the beam with which the area have been recorded. On the other hand, the difference in wavelength should be sufficiently large for a satisfactory separation of the beams by the wavelength-selective filters. One embodiment of a write and read apparatus, in which one beam had a wavelength of 780 nm and the second beam a wavelength of 840 nm, was found of perform satisfactorily. For this small difference in wavelength stringent requirements are imposed on the manufacture of the wavelength-selective mirrors 52 and 53 in FIG. 3, especially because the mirrors are arranged at an angle of 45° relative to the beams. Therefore, the apparatus in accordance with FIG. 4, in which no wavelength-selective mirrors are incorporated, is preferred. In this apparatus a highly selective λ/4 plate 55 is arranged between the polarisation-sensitive beam splitter and the objective system. Said plate only rotates the direction of polarisation of the write beam through 90° in total, so that said beam is one time transmitted and one time reflected by the beam splitter 16. The read beam RB, whose direction of polarisation is transverse to that of the write beam WB, is not subject to any change in direction of polarisation and is reflected twice by the beam splitter 16. The reflected beams WB' and RB' issuing from the beam splitter 16 have the same directions of polarisation. In order to separate said beams a highly selective λ/2 plate 56 may be arranged in the radiation path, which plate rotates the direction of polarisation of one of the beams through 90°. The two beams, which are now perpendicularly polarised, can be separated from each other by a polarisation-sensitive beam splitter 57, which transmits one of the beams, for example WB', almost completely and which almost fully reflects the other beam, RB', to the associated detectors 24 and 22. Arranged in front of the detectors, are wavelength-dependent filters 29 and 28 which block the undesired radiation.

It is alternatively possible to replace the highly selective λ/2 plate 56 and the polarisation-sensitive beam splitter 57 by a neutral beam splitter. Then the amount of radiation on each detector is smaller and more stringent requirements should be imposed on the filters 28 and 29.

In the apparatus shown in FIGS. 3 and 4 the signals $S_D$, $S_c$, $S_f$ and $S_r$ can be derived from the beams WB' and RB' by means of the detectors 22 and 24 in the same way as described with reference to FIG. 2.

In one embodiment the highly selective λ/2 plate, used for the wavelengths $\lambda_1 = 780$ nm and $\lambda_2 = 840$ nm and having a refractive-index difference $\Delta n = 0.00887$, had a thickness of 0.616 nm. A highly selective λ/4 plate of the same material and for the same wavelengths had a thickness of 0.308 nm.

In an embodiment with two diode-laser housings, the housings need not be arranged in parallel, as is shown in FIGS. 3 and 4. It is alternatively possible to arrange the two housings transversely to each other. In FIG. 4, for example, the housing 51 may be turned 90° anticlockwise and the optical train comprising the elements 38, 56, 57, 28, 22, 29 and 24 90° clockwise. The beam splitter 72 should then be replaced by a beam splitter which transmits the read beam and reflects the write beam.

The positions of the read spot and the write spot relative to each other on the information surface 8 of the record carrier 1 is determined by the angle between the beams WB and RB which emerge from the polarisation-sensitive beam splitter 16. Said angle may vary as a result of tilting of the beam splitter or tilting of the diode-laser housings. In the case of two transversely arranged diode-laser housings, this means that there are three elements whose relative angular positions should be maintained stable in a very accurate manner. The required positional accuracy of the two spots relative to each other is for example ±0.1 micron, which corresponds to an angular rotation of the beam through $\pm 2 \times 10^{-5}$ rad.

The thermal stability of the arrangement with two diode-laser housings which are disposed transversely of each other is low owing to the comparatively large distance between the backs of said housings. If the diode laser housings have a length of for example 30 mm, the distance between the backs of said housings is approximately 50 mm. Then, if the diode laser housings are incorporated in an aluminium construction which is locally heated by the laser energy, an angular rotation of the beams of approximately $2 \times 10^{-5}$ rad, will occur per degree centigrade temperature rise.

In order to improve the mechanical stability, the diode laser housings are arranged parallel to each other as shown in FIGS. 3 and 4. Said housings may now be arranged very close to each other, for example at a distance of a few mm. Since the distance between the diode laser housings is so small, temperature differences between the housings are less likely to occur, which also improves the thermal stability.

Instabilities owing to tilting of the beam splitters 16 and 52 may be precluded by having the elements form part of one composite prism 30, as is shown in FIG. 5. The prism comprises a first surface 62 having the function of the beam splitter 72 in FIG. 4 and a second, polarisation-sensitive, surface 61 which performs the function of the beam splitter 16 in FIG. 4. The write beam emitted by the diode laser housing 50 is transmitted by the prism 60, without reflection, whilst the read beam emerging from the diode laser 51 is first reflected by the surface 62 and subsequently by the surface 61. As a result of this, the angle between the beams WB and RB emerging from the composite prism 60 is independent of tilting of said prism.

A similar effect is obtained if the beam WB is reflected by the surface 61 and the beam RB is first reflected by the surface 62 and subsequently transmitted by the surface 61. The two beams then leave the composite prism on the left-hand side.

One of the ends of one of the housings, for example 50, is rigidly secured to a frame 63, whilst the corresponding end of the other housing is secured to said frame via a double-acting hinge spring 64. In view of the thermal stability the ends of the diode-laser housings from which the beams emerge are preferably connected to the frame and the hinge spring. The distance, in the tangential and the radial direction, between the radiation spots WS and RS on the information layer can be adjusted by means of two set screws 65 and 66. By adjusting the screw 65 the housing 51, can be moved so that the spot RB on the information layer can be moved in the radial direction relative to the radiation spot WS. This is illustrated by FIG. 6, which is a sectional view of the housings 50 and 51 taken on the line VI—VI′ in FIG. 5. A displacement of the read spot relative to the write spot in the tangential direction can be obtained by adjusting the screw 66.

By the use of two diode lasers in separate housings the radiation fields, specifically the astigmatism, of said lasers need not be so strictly identical as in the case of diode lasers accommodated in one housing. In the case of two separate diode-laser housings a low power auxiliary lens 54 may for example be arranged in the path of one of the beams, by means of which lens the focusing of the beams is made identical. Two separate housings also enable a more modular construction of the apparatus, permitting easy replacement of the individual diode lasers, in particular of the write laser.

What is claimed is:

1. An apparatus for recording and reading information tracks on a reflective information surface of a record carrier, said apparatus comprising a first semiconductor diode laser which emits a write beam of radiation of a first wavelength for producing detectable changes in the information surface so as to record information thereon, a second semiconductor diode laser which emits a read beam of radiation of a second wavelength which is different from said first wavelength for reading information recorded on the information surface, said first and second lasers being arranged such that said beams emitted thereby are substantially parallel, an objective system, said beams being directed through said objective system so that said objective system forms on the information surface a write spot and a read spot which is spaced from said write spot by a predetermined distance in the track direction and at least a portion of the radiation of each of said read and write beams is reflected by the information surface back along a portion of the paths traversed by the incident radiation, means for changing the polarization of at least one of said reflected read and write radiation so that the reflected radiation whose polarization has been changed has a different polarization than that of the corresponding radiation incident on the information surface, polarization sensitive means for splitting off at least a portion of said reflected radiation of the write and read beams from the radiation of the beams which is travelling towards the information structure, a beam splitter disposed in the path of one of said beams, said beam splitter being arranged to direct at least a portion of said one beam to said polarization sensitive means, a first radiation sensitive detector disposed in the path of the reflected write radiation which has been split off by said polarization sensitive means, a second radiation sensitive detector disposed in the path of the reflected read radiation which has been split off by said polarization sensitive means, and a wavelength selective filter disposed in front of each of said first and second detectors so as to reduce the amount of radiation of said second wavelength reaching said first detector and to reduce the amount of radiation of said first wavelength reaching said second detector.

2. The apparatus according to claim 1 wherein said write and read beams have orthogonal directions of polarization and said polarization sensitive means includes means for directing said beams long a substantially common path.

3. The apparatus according to claim 1 wherein said polarization changing means includes a highly selective quarter-wave plate and wherein the reflected radiation of said write beam and read beam split off by said polarization sensitive means are directed thereby along substantially the same direction.

4. The apparatus according to claim 1 wherein said polarization sensitive means is arranged so that the reflected radiation of said write and read beams are split off in substantially the same direction and pass along a substantially common path, and including a polarization sensitive beam splitter disposed in said common path and a highly selective half-wave plate disposed in said common path between said polarization sensitive means and said polarization sensitive beam splitter.

5. The apparatus according to claim 1, 3 or 4 including a lens in the path of one of said write and read beam so as to correct focusing of one beam relative to the other.

6. The apparatus according to claim 1, 3 or 4 wherein said polarization sensitive means and said beam splitter are rigidly mounted on a common base and each has a reflective element, said reflective elements being arranged such that the combined number of reflections by said two elements of the beams travelling towards the record carrier is even.

7. The apparatus according to claim 6 wherein said reflective elements are constituted by a first and a second partly reflecting surface within one composite prism.

8. The apparatus according to claim 1, 18 or 19 including a frame and a pair of housings, each of said lasers being mounted in a respective one of said housings, one of said housings being rigidly secured to said frame and one side of the other of said housings being secured to said frame for resilient movement in at least one direction, and means for adjusting the position of said other housing relative to said first housing.

9. An apparatus for recording and reading information tracks on a reflective information surface of a record carrier, said apparatus comprising a first laser which emits a write beam of radiation of a first wavelength for producing detectable changes in the information surface so as to record information thereon, a second laser which emits a read beam of radiation of a second wavelength which is different from said first wavelength for reading information recorded on the information surface, an objective system, said beams being directed through said objective system so that said objective system forms on the information surface a write spot and a read spot which is spaced from said write spot by a predetermined distance in the track direction and at least a portion of the radiation of each of said read and write beams is reflected by the information surface back along a portion of the paths traversed by the incident radiation, means for splitting off at least a portion of said reflected radiation of the write and read beams from the incident radiation of the beams which is travelling towards the information structure, said splitting off means including a wavelength sensitive means for rotating the direction of polarization of one of said write and read beams and a polarization sensitive beam splitter, said wavelength sensitive means and said beam splitter being disposed in said path portion traversed by said incident and reflected radiation, means for separating said reflected read and write radiation so that said reflected write radiation is directed along a first path and said reflected read radiation is directed along a second path, a first radiation sensitive detector disposed in said first path of the reflected write radiation which has been split off from the incident radiation, a second radiation sensitive detector disposed in said second path of the reflected read radiation which has been split off from the incident radiation, and a wavelength selective filter disposed in front of each of said first and second detectors so as to reduce the amount of radiation of said second wavelength reaching said first detector and to reduce the amount of radiation of said first wavelength reaching said second detector.

10. An apparatus as claimed in claim 9 wherein said read and write beams have the same direction of polarization and including a housing, said first and second lasers being disposed in said housing so that said beams emitted thereby are generally parallel, a polarization sensitive birefringent prism disposed in said path portion between said wavelength sensitive means and said objective and wherein said wavelength sensitive means rotates the direction of polarization of said one of said write beam and read beam by approximately 90°, said wavelength sensitive means being disposed in said path portion between said polarization sensitive beam splitter and said prism and including further means for rotating the direction of polarization of said read and write beams disposed in said path portion between said prism and said objective.

11. The apparatus according to claim 10 wherein said wavelength sensitive means is a highly selective half-wave plate.

12. The apparatus according to claim 9 wherein each of said lasers is a semiconductor diode laser.

13. The apparatus according to claim 10 or 11 wherein said prism is a Wollaston prism comprising three constituent prisms arranged along said path portion, the two outermost of said three constituent prisms having the same optical axis and substantially the same shape and dimensions and the center constituent prism having a shape and dimensions different from that of said outermost prisms and an optical axis which is perpendicular to the optical axes of said outermost prisms.

14. The apparatus according to claim 9 wherein said write and read beams have orthogonal directions of polarization.

15. The apparatus according to claim 14 wherein said wavelength sensitive means is disposed betweeen said beam splitter and the information surface and rotates the direction of polarization of said one beam through an angle such that the reflected radiation of said one beam incident on said beam splitter has substantially the same direction of polarization as that of the reflected radiation of the other of said read and write beams, said beam splitter being arranged so as to direct the reflected radiation of said beams along a common path in a different direction from that of said path portion, and wherein said separating means includes further wavelength sensitive means disposed in said common path for rotating the direction of polarization of one of said reflected write and read radiation with respect to the other, and further polarization sensitive means for directing said reflected write radiation along said first path and said reflected read radiation along said second path.

16. An apparatus for recording and reading information tracks on a reflective information surface of a record carrier, said apparatus comprising a first laser which emits a write beam of radiation of a first wavelength for producing detectable changes in the information surface so as to record information thereon, a second laser which emits a read beam of radiation of a second wavelength which is different from said first wavelength for reading information recorded on the information surface, said first and second lasers being arranged so that the beams emitted thereby are substantially parallel and have orthogonal directions of polarization, a polarization sensitive beam splitter disposed in the path of one of said write and read beams, means disposed in the path of the other of said beams for directing said other beam onto said beam splitter, said beam splitter being arranged to direct said orthogonally polarized beams incident thereon along a substantially common path, an objective system arranged in said common path so as to form from said beams a write spot and a read spot on the information surface, at least a portion of the radiation of said write and read beams being reflected by the information surface back through said objective system and along said common path, wavelength sensitive means for splitting off the reflected radiation from the radiation travelling towards the information structure and directing said reflected write radiation along a first path and said reflected read radiation along a second path which is different from said first path, a first radiation sensitive detector disposed in said first path and a second radiation sensitive detector disposed in said second path, said wavelength sensitive splitting off means including said polarization sensitive beam splitter disposed in said common path, first wavelength sensitive means disposed in said common path between said objective system and said beam splitter for changing the direction of polarization of the radiation of said one beam with respect to the radiation of said other beam such that said beam splitter directs the reflected radiation of said beams along a further common path which is different from said first-named common path, second wavelength sensitive means disposed in said further common path for changing the direction of polarization of one of said reflected read and write radiation with respect to that of the other, and a second polarization sensitive beam splitter arranged in said further common path so as to direct the reflected write radiation along said first path and the reflected read radiation along said second path.

17. The apparatus according to claim 16 including a wavelength selective filter disposed in front of each of said first and second detectors so as to reduce the amount of radiation of said second wavelength reaching said first detector and to reduce the amount of radiation of said first wavelength reaching said second detector.

* * * * *

UNITED STATES PATENT AND TRADEMARK OFFICE
CERTIFICATE OF CORRECTION

PATENT NO. : 4,546,463

DATED : October 8, 1985

INVENTOR(S) : WILLEM G. OPHEIJ ET AL

It is certified that error appears in the above-identified patent and that said Letters Patent is hereby corrected as shown below:

Claim 8, line 1, change "18" to --3--
and change "19" to --4--

Signed and Sealed this

Eighth Day of April 1986

[SEAL]

Attest:

DONALD J. QUIGG

Attesting Officer

Commissioner of Patents and Trademarks